(No Model.)

C. L. THOMAS & J. O'CONNELL.
POWER TRANSMITTING MECHANISM.

No. 585,135. Patented June 22, 1897.

Witnesses.
G. M. Anderson
P. O. Masi

Inventors
C. L. Thomas
Jno. O'Connell
by E. W. Anderson
their Attorney.

UNITED STATES PATENT OFFICE.

CHARLES LEE THOMAS AND JOHN O'CONNELL, OF BUFFALO, NEW YORK.

POWER-TRANSMITTING MECHANISM.

SPECIFICATION forming part of Letters Patent No. 585,135, dated June 22, 1897.

Application filed January 18, 1897. Serial No. 619,676. (No model.)

*To all whom it may concern:*

Be it known that we, CHARLES LEE THOMAS and JOHN O'CONNELL, citizens of the United States, and residents of Buffalo, in the county of Erie and State of New York, have invented certain new and useful Improvements in Transmitting Power; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
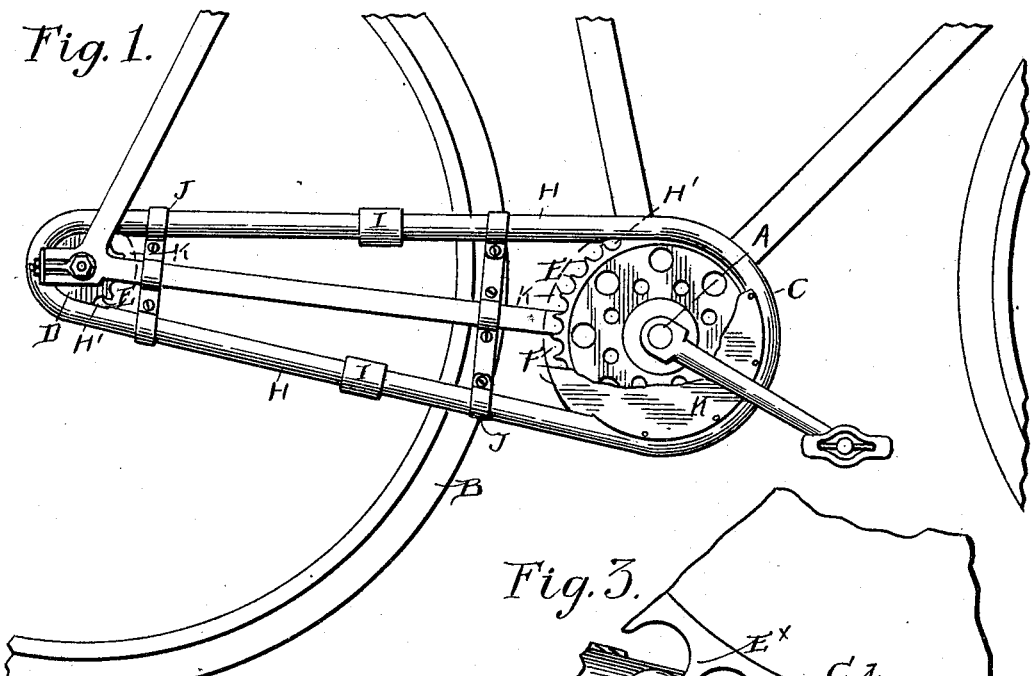
Figure 3:
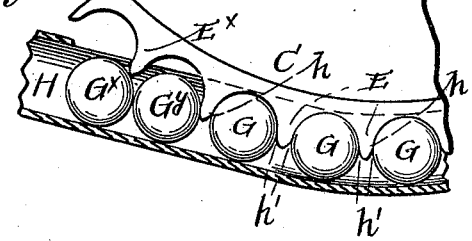
Figure 2:
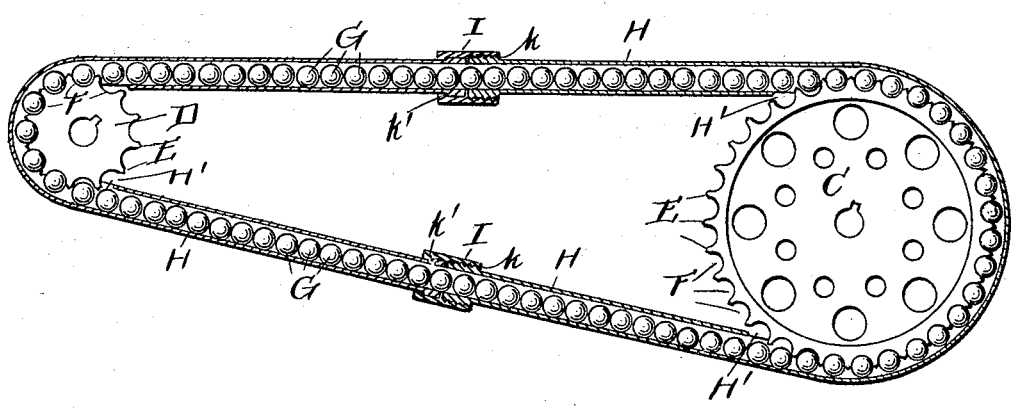

Figure 1 of the drawings is a side elevation showing the invention with casing partly broken away. Fig. 2 is a sectional view of the casing, and Fig. 3 is a detail view of the same.

This invention has relation to the mechanical transmission of power from one point to another, and is designed to provide power-transmitting means or mechanism of improved character in which there is a minimum of loss through friction and slippage, which can be employed wherever two wheels or shafts are to be connected, no matter what may be their relative positions or angular relations, and with which the loss from wear and the danger of accident or breakage are reduced to a minimum.

With this object in view the invention consists in the novel construction and combination of parts, all as hereinafter described, and pointed out in the appended claims.

Although in the accompanying drawings we have illustrated our invention as applied to the driving-gear of a bicycle, for which purpose it is of great utility, we remark that its application is in practice of much wider scope, as will be readily understood.

In the drawings the letter A designates the usual crank-shaft of the bicycle, and B the rear or driving wheel. C designates a wheel fast on said shaft and corresponding to the usual large sprocket-wheel. D is a wheel on the hub of the rear wheel A and corresponding to the usual small sprocket-wheel. The peripheries of these two wheels C and D are formed each with teeth E, whose faces are concave, and which are separated from each other by concave spaces F, whose curvature is coincident and continuous with the curvature of the teeth.

G designates a continuous endless series of balls which constitute the power-transmitting and driving connection between the two wheels, to the teeth of which they are adapted. These balls work in an endless guide or runway H, which consists in the present instance of a closed tube formed in sections and closely adapted to the adjacent peripheral portions of the wheels C and D. Adjacent to said wheels the tube is slotted, as indicated at H', to bring the balls in contact with the teeth. The ends of adjacent sections are united by means of sleeve-nuts I, each of which is threaded upon one section, as shown at $k$, and has a shouldered engagement with the other section, as indicated at $k'$. The tube is fastened to the frame of the bicycle by means of clips or brackets J. By unscrewing one of the sleeve-nuts I one section may be sprung laterally with respect to the other a sufficient distance to permit the balls to be removed or inserted.

It is necessary to the successful practical operation of the gearing that the teeth E of the wheel C shall be of considerable thickness at the points $h$, which points correspond to, or very nearly to, the center line of the series of balls. Their thickness at these points should be equal, approximately, to one-fourth the diameter of the balls. The points of the teeth should extend beyond the centers of the balls and should be rounded, as indicated at $h'$. By this construction the teeth have the necessary strength, and also, which is of equal importance, have a proper rolling contact with the balls. By reason of this thickness of the teeth it will be observed that the balls in passing over said wheels are separated from each other until just about the time when each ball in turn leaves the wheel, when the succeeding ball catches up with it. This will appear more readily by reference to Fig. 3, wherein the tooth $E^x$ is shown as just leaving the ball $G^x$, while the next ball $G^y$ has just caught it by reason of the fact that it is moving ahead at a greater speed than the ball $G^x$. It will also be noted that the point of the tooth $E^x$ has a rolling action upon the ball instead of a direct pushing or biting action, as would be the case with teeth of pointed form. By reason of the thickness of the teeth, as above described, and the consequent separation of the balls in passing over the wheels the internal length of the runway is considerably greater than the aggregate diameter of the series of balls.

The teeth of the wheel D should be constructed in the same manner as those of the wheel E.

The internal diameter of the runway H should be sufficiently larger than the diameter of the balls to cause the latter to contact only with the bottom or lower walls thereof. Otherwise the balls will in operation tend to push or slide instead of roll, and thereby greatly increase the friction.

Both gear-wheels C and D are preferably boxed in or incased, as indicated at K, in order to exclude all dust or dirt in so far as possible.

The gearing described is particularly desirable upon bicycles for the reason that it is practically noiseless, is light running, can be readily applied to bicycles now in use without change in the frame thereof, and does away with the chain and the contact therewith of the clothes. It also greatly reduces the danger of accidents from the clothing being caught, as with the ordinary chain, and is much less likely to break or get out of order.

To illustrate the wider application of the invention, the shaft A may be regarded as any shaft from which power is to be transmitted, and D may be regarded as a wheel upon any shaft to which power is to be transmitted.

It will be seen that the guide or runway can be readily adapted to any relative position or angular relation of the two shafts and that the series of balls will readily operate therein.

For general use in machinery the invention will be found to be of great value for the reasons above stated, and also in view of the fact that its use will avoid the accidents which frequently occur where belts are employed by reason of persons being caught thereby.

Having thus described our invention, what we claim as new, and desire to secure by Letters Patent, is—

1. Means for transmitting power, consisting in the combination with a driving-wheel and a driven wheel, each of which has concave teeth with thick rounded points, of an endless series of balls adapted to the said teeth and entirely separated from each other at the wheels by their thick and rounded points, which project between the said balls and beyond the center line thereof and an endless guide or runway for the said balls, substantially as specified.

2. In apparatus for the transmission of power, the combination with an endless series of unattached balls in an endless runway, of a drive-wheel and a driven wheel having concavities for the reception of the balls, and round end teeth protruding between the balls and separating the same by a distance equal to about one-fourth of their diameter, substantially as specified.

3. Means for transmitting power, consisting in the combination with a driving-wheel and a driven wheel, each of which has a series of concave teeth, of an endless series of balls adapted to said teeth, and an endless guide or runway for said balls, the internal diameter of said runway being appreciably greater than the diameter of the balls, said teeth having round points which separate said balls at the wheels and which project beyond the center line of the series of balls, substantially as specified.

4. Means for the transmission of power, consisting in the combination with the driving and driven wheels, each of which has a series of concave teeth formed with thick rounded points, of an endless series of balls adapted to the said teeth, and an endless guide or runway for said balls, said runway being formed in sections, and sleeve-nuts which connect the said sections, each of said nuts having a threaded engagement with one section and a shouldered engagement with the other section, the diameter of said balls being less than the internal diameter of the runway, whereby they contact therewith at the bottom only, substantially as specified.

In testimony whereof we affix our signatures in presence of two witnesses.

CHARLES LEE THOMAS.
JOHN O'CONNELL.

Witnesses for C. L. Thomas:
  GEORGE H. PARMELEE,
  P. C. MASI.
Witnesses for John O'Connell:
  ALBERT J. SIGMAN,
  FRANK HARDY.